(12) United States Patent
Gamberini et al.

(10) Patent No.: US 7,571,073 B2
(45) Date of Patent: Aug. 4, 2009

(54) ACQUISITION SYSTEM FOR DETECTING THE ANGULAR POSITION OF A GAS TWIST GRIP IN A MOTORCYCLE

(75) Inventors: Giuseppe Gamberini, Bologna (IT); Claudio Grossi, Quarto Inferiore (IT); Roberto Piciotti, Bologna (IT); Maurizio Fiorentini, Molinella (IT)

(73) Assignee: Magneti Merelli Powertrin S.p.A., Corbetta (IT)

( * ) Notice: Subject to any disclaimer, the term of this patent is extended or adjusted under 35 U.S.C. 154(b) by 0 days.

(21) Appl. No.: 11/827,092

(22) Filed: Jul. 9, 2007

(65) Prior Publication Data
US 2008/0154537 A1 Jun. 26, 2008

(30) Foreign Application Priority Data
Jul. 7, 2006 (EP) .................................. 06425475

(51) Int. Cl.
*G06F 19/00* (2006.01)
(52) U.S. Cl. ........................... 702/151; 702/150
(58) Field of Classification Search ................. 702/151, 702/150
See application file for complete search history.

(56) References Cited

U.S. PATENT DOCUMENTS

| | | | |
|---|---|---|---|
| 4,693,111 A | | 9/1987 | Arnold et al. |
| 6,832,511 B2 * | | 12/2004 | Samoto et al. ............ 73/114.36 |
| 2004/0216550 A1 * | | 11/2004 | Fallak et al. ................ 74/551.9 |
| 2007/0157902 A1 * | | 7/2007 | Possehl et al. .............. 123/400 |

FOREIGN PATENT DOCUMENTS

| | | | |
|---|---|---|---|
| DE | 4235880 | A1 | 4/1994 |
| EP | 1338500 | A1 | 8/2003 |
| EP | 1553277 | A1 | 7/2005 |
| FR | 2570177 | A1 | 3/1986 |
| JP | 06344968 | A | 12/1994 |
| JP | 2001280163 | A | 10/2001 |
| JP | 2003252273 | * | 9/2003 |
| JP | 2004314929 | * | 11/2004 |
| JP | 2005194925 | * | 7/2005 |

* cited by examiner

*Primary Examiner*—Edward R Cosimano
*Assistant Examiner*—Douglas N Washburn
(74) *Attorney, Agent, or Firm*—FSP LLC

(57) ABSTRACT

A system for acquiring the angular position of a gas twist grip in a motorcycle; the acquisition system is provided with a fixed supporting body; a rotating shaft turnable mounted in the supporting body; a transmission device mechanically connected to the gas twist grip and to the revolving shaft to transmit the motion of the gas twist grip to the revolving shaft itself; a main angular position sensor, which is carried by the supporting body, is coupled to the revolving shaft to determine the angular position of revolving shaft, and is adapted to provide two reciprocally redundant measures of the angular position of the revolving shaft; and an angular control position sensor, which is carried by the supporting body, is coupled to the revolving shaft to determine the angular position of the revolving shaft, and is adapted to provide two reciprocally redundant measures of the angular position of the revolving shaft.

16 Claims, 2 Drawing Sheets

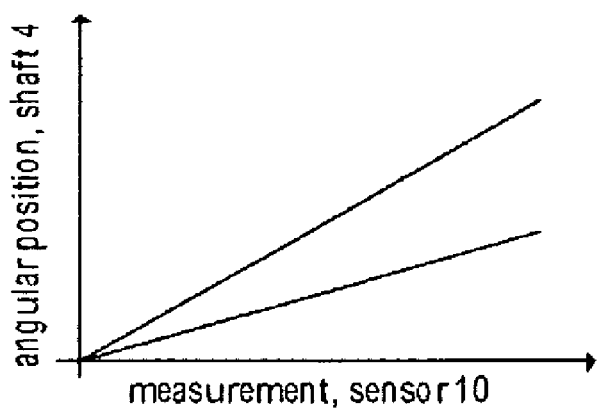
Fig.2
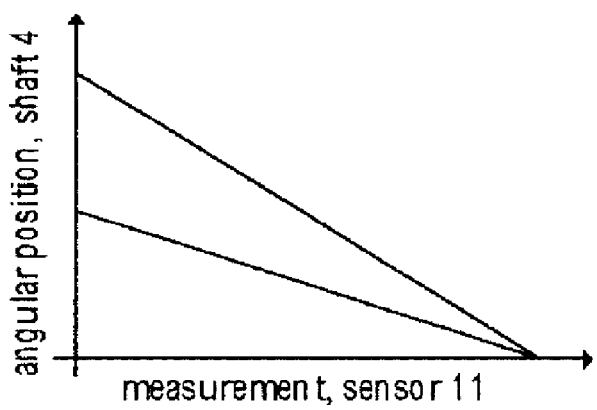
Fig.3
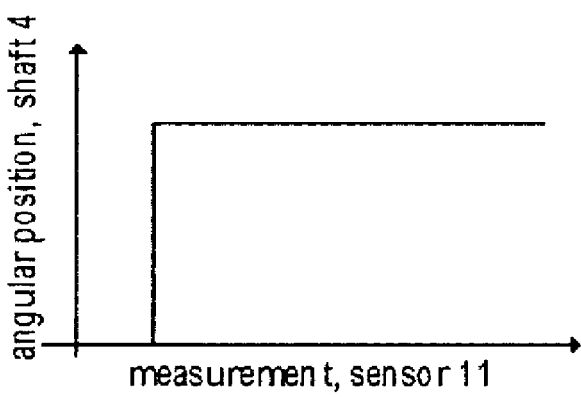
Fig.4
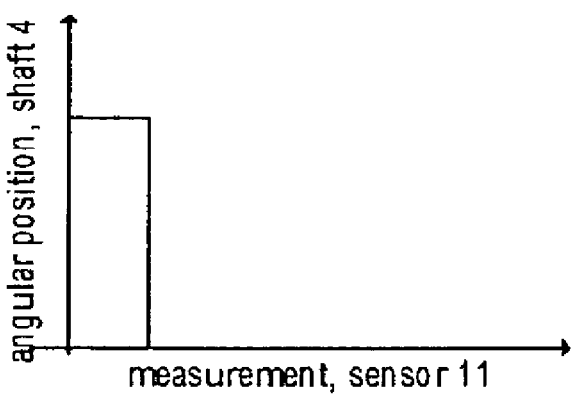

ACQUISITION SYSTEM FOR DETECTING THE ANGULAR POSITION OF A GAS TWIST GRIP IN A MOTORCYCLE

PRIORITY

Foreign priority benefits under Title 35, United States Code Sections 119 and/or 365 are claimed for the foreign application for patent listed below:

European application number 06425475.8, having the title ACQUISITION SYSTEM FOR DETECTING THE ANGULAR POSITION OF A GAS TWIST GRIP IN A MOTORCYCLE, filed on Jul. 7, 2006.

The present invention relates to a system for acquiring the angular position of a gas twist grip in a motorcycle.

BACKGROUND OF THE INVENTION

A traditional motorcycle comprises a gas twist grip (conventionally the grip on the right of the handlebar), which is turnably mounted and mechanically connected to an engine control which adjusts the generation of motive torque. Normally, the gas twist grip is connected to the engine control via at least one metallic Bowden wire, which is inserted within an external sheath, slides with respect to the sheath itself and is pushed by a spring towards a home position corresponding to no motive torque.

Recently, borrowing from the experience accrued in the automotive sector, the application of DBW (Drive By Wire) systems has been proposed, in which the gas twist grip is no longer mechanically connected to the engine control, but is connected only to a position sensor which detects the position of the gas twist grip and consequently drives an actuator which mechanically operates the engine control.

The biggest problem that must be faced in designing a DBW system adapted for use on a motorcycle is the making of an acquisition system for detecting the angular position of the gas twist grip. Indeed, such acquisition system must be capable of rapidly interpreting without errors the driver's intention to accelerate/decelerate, of providing redundant data so as to ensure certain interpretation of the driver's intention by an engine control unit, and must be installable in the context of a motorcycle taking into account the issues related to dimensions, high vibrations which may occur in a motorcycle, and to the adverse weather conditions related to the lack of protection (accidental shocks, very low or very high temperature, water sprays, etc.).

Furthermore, an acquisition system adapted to be used in a motorcycle must be extremely versatile in order to be easily integrated also on very different motorcycles because the production of motorcycles is highly fragmented and characterised by a vast production of models often in small numbers.

In the automotive field, there are various solutions for making an acquisition system for detecting the position of the gas pedal; however, such automotive solutions cannot be used on a motorcycle because they are too big and non sufficiently robust.

SUMMARY OF THE INVENTION

It is the object of the present invention to provide an acquisition system for detecting the angular position of a gas twist grip in a motor cycle, such system being free from the drawbacks described above, and in particular, easy and cost-effective to implement.

According to the present invention, it is provided an acquisition system for detecting the angular position of a gas twist grip in a motorcycle according to the attached claims.

BRIEF DESCRIPTION OF THE DRAWINGS

The present invention will now be described with reference to the accompanying drawings illustrating a non-limitative embodiment example, wherein:

FIG. 2 is a chart of the two outputs of a first angular position sensor of the acquisition system in FIG. 1;

FIG. 3 is a chart of the two outputs of a second angular position sensor of the acquisition system in FIG. 1; and FIG. 4 is a chart of the two outputs of the second angular position sensor according to an alternative embodiment.

DETAILED DESCRIPTION OF THE INVENTION

Figure 1:
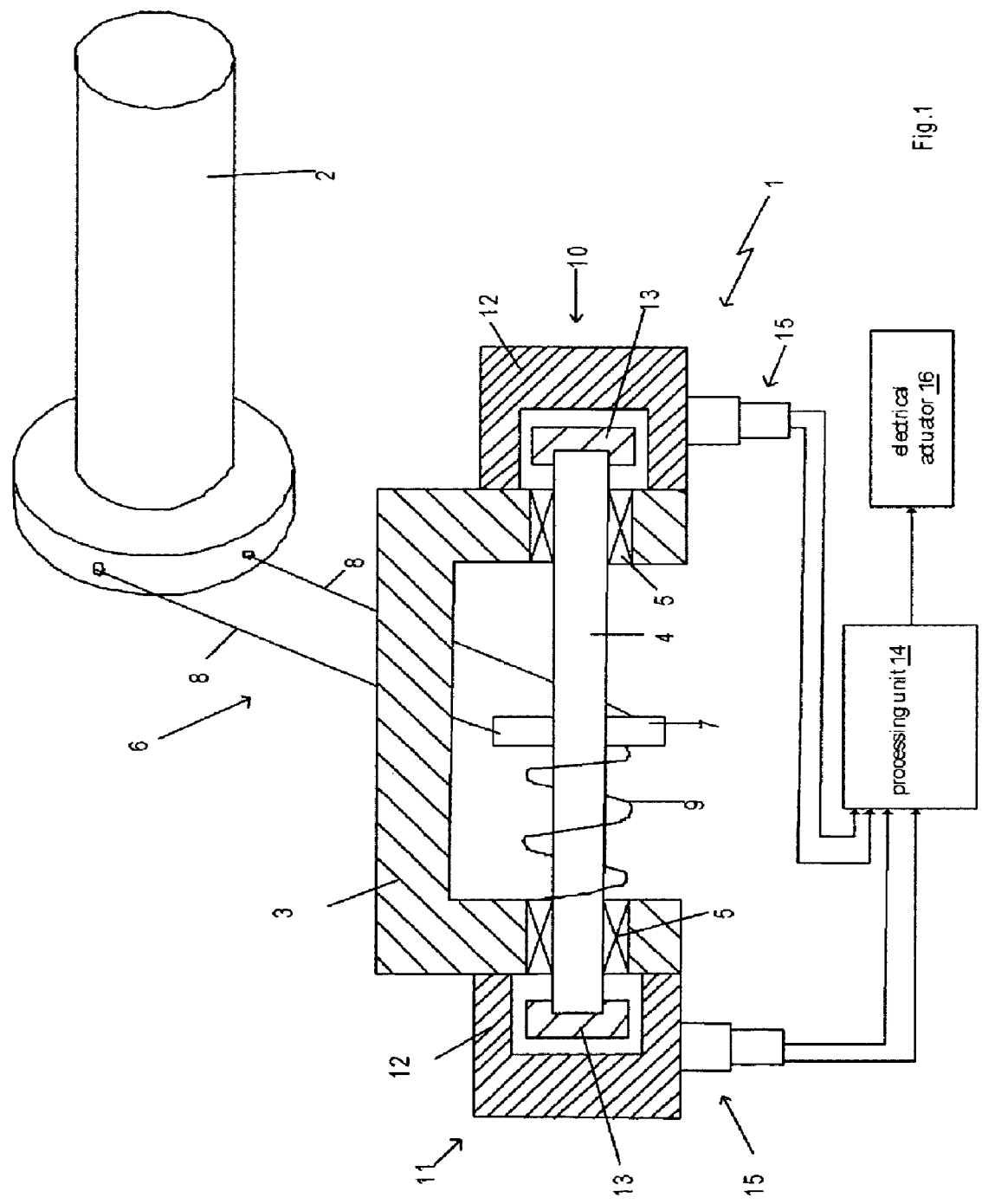
FIG. 1 is a schematic view of an acquisition system for detecting the angular position of a gas twist grip in a motorcycle made according to the present invention.

In FIG. 1, number 1 indicates as a whole an acquisition system for detecting the angular position of a gas twist grip 2 of a motorcycle for a DBW (Drive By Wire) control system.

Acquisition system 1 comprises a fixed supporting body 3, which is arranged at a certain distance from gas twist grip 2 and is "C"-shaped; supporting body 3 accommodates a revolving shaft 4, which is idling mounted by means of a pair of bearings 5 to freely turn about a central axis. Revolving shaft 4 protrudes from fixed supporting body 3 at two opposite ends of the rotating shaft 4 itself and is mechanically connected to gas twist grip 2 by means of a transmission device 6 which transmit motion from gas twist grip 2 to rotating shaft 4 itself.

According to the embodiment shown in FIG. 1, transmission device 6 is of the wire type and comprises a push-pull type pulley 7 integral with revolving shaft 4 and a pair of wires 8 of the Bowden type (i.e. slidingly accommodated in the respective external sheaths), each of which presents one end secured to gas twist grip 2 and one opposite end integral to pulley 4. Pulley 7 is arranged in a middle position with regard to revolving shaft 4 itself and therefore is accommodated in a protected position within fixed supporting body 3.

According to a different embodiment, not shown, transmission device is of the wire type and comprises a pulley 7 integral with revolving shaft 4 and one only Bowden type wire 8, which presents one end secured to gas twist grip 2 and one opposite end integral with pulley 7.

According to a further embodiment not shown, revolving shaft 4 is coaxial to grip 2 and transmission device 6 comprises a direct mechanical connection to make revolving shaft 4 angularly integral with twist grip 2.

Normally, a return spring 9 is envisaged and arranged around revolving shaft 4 to push at a certain force revolving shaft 4 itself towards a home position corresponding to no motive torque.

Fixed supporting body 3 accommodates a main angular position sensor 10 and a control angular position sensor 11, such angular position sensors being reciprocally separate and independent and being coupled to revolving shaft 4 at opposite ends of revolving shaft 4 itself to determine the angular position of revolving shaft 4. Each angular position sensor 10 or 11 presents a fixed part or stator 12 integral with fixed supporting body 3 and a mobile part or rotor 13 integral with revolving shaft 4. Furthermore, each angular position sensor 10 or 11 is adapted to provide two reciprocally redundant angular position measures to revolving shaft 4; in this way, the correct operation of angular position sensor 10 or 11 can be checked thus implementing a self-diagnosis of angular position sensor 10 or 11 itself.

Finally, acquisition system 1 comprises a processing unit 14, which is connected to both angular position sensors 10 and 11, uses the signals provided by main angular position sensor 10 to determine the angular position of gas twist grip 2, and uses the signals provided by control angular position sensor 11 to check and validate the signals provided by main angular position sensor 10. In other words, the angular position of gas twist grip 2 is determined solely by using the signals provided by main angular position sensor 10, while the signals provided by control angular positions sensor 11 are used only to check and validate the signals provided by main angular position sensor 10, i.e. to diagnose possible faults of main angular position sensor 10 which do not arise from the comparison of the two redundant outputs of main angular position sensor 10 itself.

According to a preferred embodiment, each angular position sensor 10 or 11 is connected to processing unit 14 by means of its own wiring 15 (comprising connectors and wire) independent from the other angular position sensor 11 or 10.

Processing unit 14 according to the angular position of gas twist grip 2 controls an electrical actuator 16, which mechanically acts on a motor control (not shown) of the motorcycle to regulate the generation of motive torque; by the way of example, in a petrol operated internal combustion engine, electrical actuator 16 controls the angular position of a throttle valve regulating the flow of fresh air aspirated by the engine.

According to a preferred embodiment, main angular sensor position 10 is a double potentiometer with two ratiometric linear outputs in the 0-5 volt range and in which a measure of the angular position of revolving shaft 4 is equal to half the other measure of the angular position of revolving shaft 4. By the way of example, the measures provided by main angular sensor 10 according to the angular position of revolving shaft 4 are shown in FIG. 2. Processing unit 14 receives both measures provided by main angular rotation sensor 10 and checks coherence of such measures to determine possible faults; in other words, processing unit 14 always checks that one measure provided by main angular position sensor 10 is double the other measure provided by main angular position sensor 10 and if this is not so emits a failure diagnosis of main angular position sensor 10 itself.

According to a preferred embodiment, also control angular sensor position 11 is a double potentiometer with two ratiometric linear outputs in the 0-5 volt range and in which a measure of the angular position of revolving shaft 4 is equal to half the other measure of the angular position of revolving shaft 4. By the way of example, the measures provided by control angular sensor 11 according to the angular position of revolving shaft 4 are shown in FIG. 3. Processing unit 14 receives both measures provided by control angular rotation sensor 11 and again checks coherence of such measures to determine possible faults; in other words, processing unit 14 always checks that one measure provided by control angular position sensor 11 is double the other measure provided by control angular position sensor 11 and if this is not so emits a failure diagnosis of control angular position sensor 11 itself. Preferably, the two angular position measures of revolving shaft 4 by control angular position sensor 11 follow a different law with respect to the two angular position measures of revolving shaft 4 by angular position sensor 10 so as to better identify possible problems (e.g. an electrical failure determining a variation of electrical potential of the electrical load); this situation is immediately evident by comparing the chart in FIG. 2 related to angular position sensor 10 and the chart in FIG. 3 related to control angular position sensor 11.

According to an alternative embodiment, control angular position sensor 11 presents two digital type outputs which indicate whether revolving shaft 4 is about a certain angular position or not. By the way of example, the measures provided by control angular sensor 11 according to the angular position of revolving shaft 4 are shown in FIG. 4. Preferably, the two digital type outputs of control angular positions sensor 11 indicate whether the revolving shaft 4 is about a angular home position corresponding to no motive traction or not; such angular home position is the most important because the severest danger in the event of failure of a DBW is not realising that the driver is asking to cancel out generation of motive torque and therefore to accelerate the motorcycle against the driver's will.

Acquisition system 1 described above presents a lot of advantages, because it is simple and cost-effective to make, extremely flexible because it can be easily installed in any type of motorcycle, and interfaces with a traditional type gas twist grip reducing the investments needed for implementation. In particular, acquisition system 1 described above allows to maintain gas twist grip 2 of the traditional type having a wire connection (extremely well tested and reliable); consequently, supporting body 3 can be installed in a very protected area, both with respect to possible falls and accidental shocks, and with respect to atmospheric and environmental elements. Furthermore, acquisition system 1 described above ensures a standard solution for a motorcycle DBW system and integrates in a single object all the "gas demand" functions and all the redundancies required by safety.

The invention claimed is:

1. A system (1) for acquiring the angular position of a gas twist grip (2) in a motorcycle; the acquisition system (1) comprises:
   a fixed supporting body (3);
   a rotating shaft (4) turnable mounted in the supporting body (3);
   a transmission device (6) mechanically connected to the gas twist grip (2) and to the revolving shaft (4) to transmit the motion of the gas twist grip (2) to the revolving shaft (4) itself;
   a main angular position sensor (10), which is carried by the supporting body (3), is coupled to the revolving shaft (4) to determine the angular position of revolving shaft (4), and is adapted to provide two reciprocally redundant measures of the angular position of the revolving shaft (4);
   an angular control position sensor (11), which is separate and independent from the main angular position sensor (10), is carried by the supporting body (3), is coupled to the revolving shaft (4) to determine the angular position of the revolving shaft (4), and is adapted to provide two reciprocally redundant measures of the angular position of the revolving shaft (4) that are independent from the two reciprocally redundant measures of the angular position of the revolving shaft (4) provided by the main angular position sensor (10).

2. An acquisition system (1) according to claim 1 and comprising a processing unit (14), which is connected to both angular position sensors (10, 11), uses the signals provided by the main angular position sensor (10) to determine the angular position of the gas twist grip (2), and uses the signals provided by the control angular position sensor (11) to check and validate the signals provided by the main angular position sensor (10).

3. An acquisition system (1) according to claim 1, wherein the angular position two sensors (10, 11) are arranged at the opposite ends of the revolving shaft (4).

4. An acquisition system (1) according to claim 1, wherein the main angular position sensor (10) is a double potentiometer.

5. An acquisition system (1) according to claim 4, wherein for the main angular position sensor (10) one measure of the angular position of the revolving shaft (4) is equal to half the other measure of the angular position of the revolving shaft (4).

6. An acquisition system (1) according to claim 4, wherein the control angular position sensor (11) is a double potentiometer.

7. An acquisition system (1) according to claim 6, wherein the two measures of the angular position of revolving shaft (4) by the control angular position sensor (11) follow a different law with respect to the two measures of the angular position of the revolving shaft (4) by the main angular position sensor (10).

8. An acquisition system (1) according to claim 1, wherein the control angular position sensor (11) presents two digital type outputs which indicate whether the revolving shaft (4) is about a certain angular position or not.

9. An acquisition system (1) according to claim 8, wherein the control angular position sensor (11) presents two digital type outputs which indicate whether the revolving shaft (4) is about a certain home angular position corresponding to no motive torque or not.

10. An acquisition system (1) according to claim 1, wherein each angular position sensor (10; 11) is connected to the processing unit (14) by means of its own wiring (15) independently from the other angular position sensor (11; 10).

11. An acquisition system (1) according to claim 1, wherein the transmission device (6) is of the wire type and comprises a pull-push type pulley integral with the revolving shaft (4) and a pair of Bowden type wires, each of which presents one end secured to the gas twist grip (2) and one opposite end integral with the pulley.

12. An acquisition system (1) according to claim 1, wherein the transmission device (6) is of the wire type and comprises a pulley integral with the revolving shaft (4) and a Bowden type wire, which presents one end secured to the gas twist grip (2) and one opposite end integral with the pulley.

13. An acquisition system (1) according to claim 1, wherein the transmission device (6) comprises a direct mechanical connection to make the revolving shaft (4) coaxial and angularly integral with the twist grip (2).

14. An acquisition system (1) according to claim 1, wherein a return spring (9) is arranged around the revolving shaft (4) to push at a certain force the revolving shaft (4) itself towards a home position corresponding to no motive torque.

15. An acquisition system (1) according to claim 14, wherein the fixed supporting body (3) is "C"-shaped and crossed by the revolving shaft (4) which protrudes from the fixed supporting body (3) at two opposite ends of the rotating shaft (4) itself.

16. An acquisition system (1) according to claim 15, wherein the transmission device (6) is of the wire type and comprises a pulley integral with the revolving shaft (4) and arranged in a middle position of the revolving shaft (4) itself and at least one Bowden type wire, which presents one end secured to the gas twist grip (2) and one opposite end integral with the pulley.

\* \* \* \* \*

UNITED STATES PATENT AND TRADEMARK OFFICE
CERTIFICATE OF CORRECTION

| | | |
|---|---|---|
| PATENT NO. | : 7,571,073 B2 | Page 1 of 1 |
| APPLICATION NO. | : 11/827092 | |
| DATED | : August 4, 2009 | |
| INVENTOR(S) | : Gamberini et al. | |

It is certified that error appears in the above-identified patent and that said Letters Patent is hereby corrected as shown below:

Title page

Item 73 – Assignee

"Magneti Merelli Powertrin S.p.A." should read "Magneti Marelli Powertrain S.p.A."

Signed and Sealed this
Fourth Day of March, 2014

Michelle K. Lee
*Deputy Director of the United States Patent and Trademark Office*